UNITED STATES PATENT OFFICE.

JOHN ROY MASSON, OF MELBOURNE, VICTORIA, AUSTRALIA.

PROCESS FOR RECOVERING ANTIMONY FROM ORES AND THE LIKE.

975,148.  Specification of Letters Patent.  Patented Nov. 8, 1910.

No Drawing.   Application filed October 26, 1909.  Serial No. 524,667.

*To all whom it may concern:*

Be it known that I, JOHN ROY MASSON, a subject of the King of Great Britain and Ireland, residing at No. 7 St. James' Buildings, William street, Melbourne, in the British State of Victoria, Commonwealth of Australia, assayer and metallurgist, have invented a new and useful Process for Recovering Antimony from Ores and the Like, of which the following is a specification.

This invention consists of a wet process for the recovery of antimony in a pure state, by a continuous process from ores, concentrates, tailings and slimes containing it.

In carrying out my process the ore or material containing antimony is finely pulverized and is then treated with a solution of caustic potash, caustic soda, or any other alkali of the requisite strength, hot or cold. By such means the antimonial contents are dissolved. The said solution containing the antimony is then drawn off by filtration, decantation or other means and run into vats. Aluminium, preferably in the form of sheets, is now introduced into the solution and placed for preference in a vertical position; action is at once set up and the antimony contained in the solution is deposited on the aluminium, in the form of thin flakes, which sink to the bottom as they leave the sheets. The solution after precipitation of the antimony as above is separated from the precipitate by filtration, decantation or other means and is then ready to again treat a fresh charge of ore. The original ore after the extraction of the antimony may be treated for its gold contents by any well known means.

I prefer to employ agitation when extracting the antimony from the ore with the alkaline solution and find I obtain the best results by using what is well known as the "A. Z. agitator" and which is covered by United States Patent No. 798568 dated 29th August 1905. Again I prefer caustic soda as a solvent for the antimony as it is cheaper than the other reagents mentioned, while the strength of the solution used varies according to the percentage of antimony present in the material to be treated. For instance, for ores containing 50% antimony I find a solution containing 4% caustic soda gives good results. For ore containing 20% antimony a solution containing 2.5% of the alkali is in my opinion, a good solution to use.

Having now described my invention what I claim as new and desire to secure by Letters Patent is:—

1. A process for recovering antimony consisting in subjecting the material to an alkali solution and then precipitating the antimony on aluminum.

2. The herein described process for the recovery of antimony in a pure state from ores or concentrates or from tailings and slimes consisting in dissolving the antimonial contents with a solution of caustic alkali and then precipitating the antimony contained therein on aluminium—substantially as described.

In testimony whereof I have signed my name to this specification in the presence of two subscribing witnesses.

JOHN ROY MASSON.

Witnesses:
 BEDLINGTON BODYCOMB,
 W. J. S. THOMPSON.